3,174,173
WINDSHIELD WIPER BLADE ASSEMBLY
Harold P. Phillips and Jerry J. Carr, Hastings, Mich.,
assignors to Hastings Manufacturing Company, Hastings, Mich.
Filed May 21, 1962, Ser. No. 196,155
11 Claims. (Cl. 15—250.42)

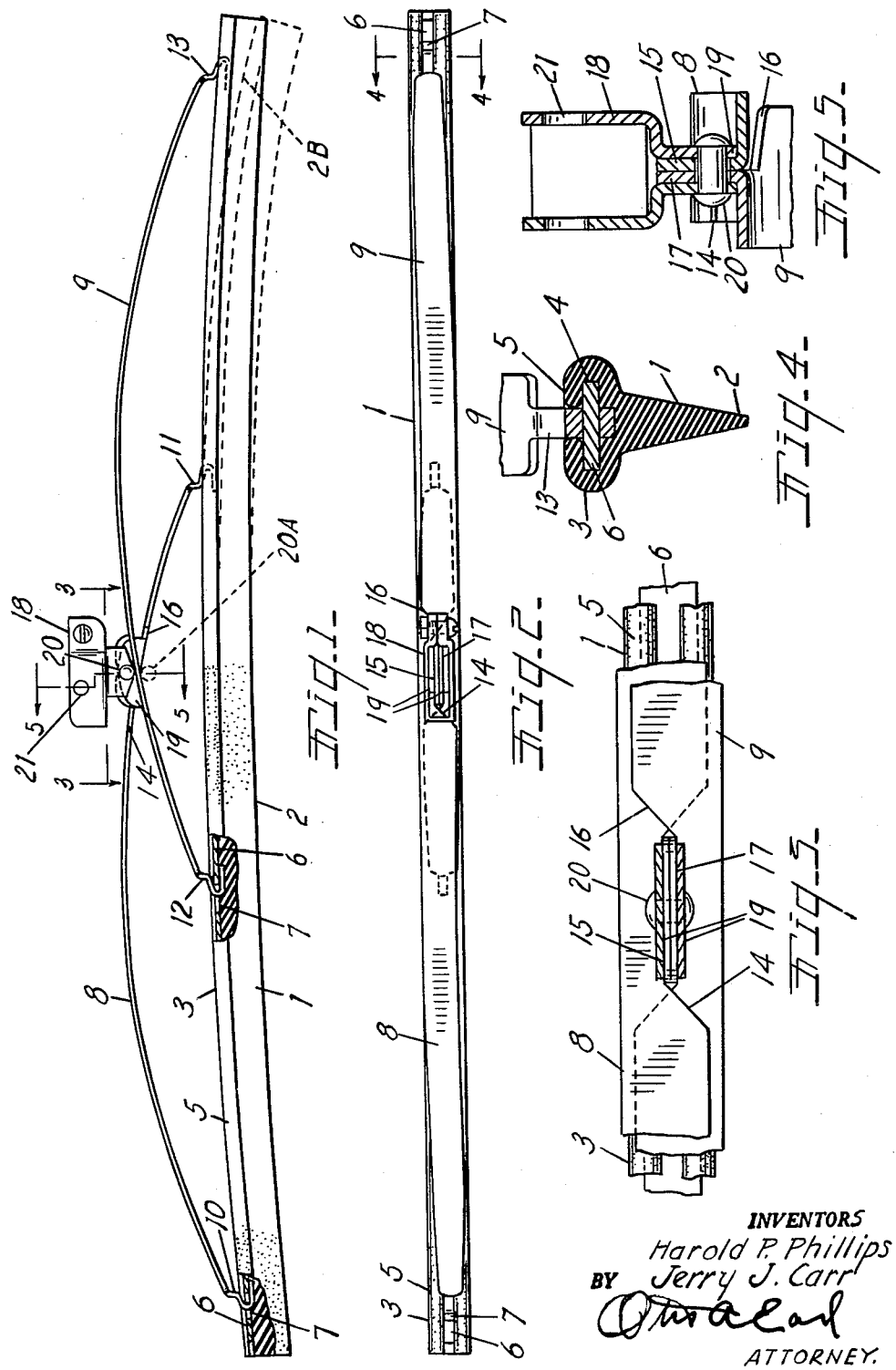

This invention relates to improvements in windshield wiper blade assembly. The principal objects of this invention are:

First, to provide a bendable wiper blade with supporting and driving bows connected to the back of the blade which are flexible and moveable relative to each other and the blade to cause the blade to conform firmly with the compoundly curved surface of a windshield as the blade is oscillated in an arc across the windshield.

Second, to provide a blade with mounting and driving bows which cause relatively small deflections of intermediate portions of the blade and bows to result in relatively larger and more sharply bowed deflection of the radially outer end of the blade.

Third, to provide a blade and supporting bow assembly which will conform closely and evenly to a compoundly curved windshield and which is relatively inexpensive and has a minimum number of parts.

Fourth, to provide a wiper blade assembly with a pair of springable driving bows that are arranged in crossing relation to connect to the blade at four longitudinally spaced positions along the blade to distribute the driving and pressing forces of a windshield wiper arm to the blade.

Other objects and adavntages of the invention will be apparent from a consideration of the following description and claims. The drawings, of which there is one sheet, illustrate a highly practical form of the wiper blade assembly.

FIG. 1 is a side elevational view partially in cross section of the blade assembly of the invention.

FIG. 2 is a front or outer plan view of the blade.

FIG. 3 is a fragmentary enlarged cross sectional view taken along the plane of the line 3—3 in FIG. 1 showing the pivoted and driving connection between the bows and the driving bracket of the assembly.

FIG. 4 is a fragmentary transverse cross secitonal view taken along the plane of the line 4—4 in FIG. 2 and illustrating the connection between the end of one of the bows and the squeegee blade.

FIG. 5 is a fragmentary transverse cross sectional view taken along the plane of the line 5—5 in FIG. 1 and showing the driving and pivoted connection between the bows and the driving bracket of the blade assembly.

The wiper blade assembly of the invention is designed to operate on compoundly curved automobile windshields which curve rearwardly in vertical and horizontal planes at the upper and side edges of the windshield. As is well known windshield wiper blades are driven in an arc in both directions from a central upright position and must assume various curved positions as the squeegee blade travels over the compoundly curved surface of the windshield.

The present invention provides a squeegee blade 1 of relatively flexible rubber-like material having a relatively thin wiper edge 2 and a relatively transversely thickened back 3. The back defines an outwardly opening slot 4 extending longitudinally of the blade with overlapping side flanges 5 along each side of the slot.

A reinforcing bar or strip 6 is positioned in the slot to flex in a longitudinal plane perpendicular to the back but resisting transverse or lateral bending of the blade and strip. The reinforcing strip 6 defines attaching holes 7 at the ends of the strip and at spaced intermediate points permitting connection of the ends of mounting and driving bows to the reinforcing strip and the squeegee blade.

Two bows which may be designated as a lower bow 8 and an upper bow 9 are formed of flat springable material such as spring steel and have narrowed tongues 10, 11, 12 and 13 formed on their ends which are passed inwardly through the holes 7 and crimped under the reinforcing strip 6 to connect the bows to the squeegee blade. The bows 8 and 9 are flexible in the same general plane as the reinforcing strip 6 but are transversely or laterally rigid to impart driving force to the blade.

As appears more clearly from FIGS. 3 and 5 the lower bow 8 is transversely notched as at 14 and provided with an upstanding ear 15 on the inner edge of the notch. The upper bow 9 is oppositely notched as at 16 and provided with an upstanding ear 17 and the bows are assembled in crossing interlapped relation at the notches with the ears 15 and 17 in opposed lapped relation. A box-like attaching fixture 18 is provided with depending ears 19 positioned on opposite sides of the ears 15 and 17 and a pivot in the form of the rivet 20 is passed through all four ears. The bracket 18 is provided with mounting holes 21 or otherwise suitably conformed to be connected to the driving arm of a windshield wiper. Various types of wiper arms require different shapes of connecting brackets so the bracket is not described in greater detail.

Desirably the connections or tongues 11 and 12 which form the interior connections to the squeegee blade are positioned symmetrically on opposite sides of the longitudinal center of the squeegee blade and are somewhat closer together than the distance between the ears 10 and 12 or the ears 11 and 13. It will be noted that the bows 8 and 9 may be identical parts assembled by reversing one of the bows and the spacing between the ears or connections 11 and 12 will be determined by the distance of the notches 14 and 16 from the ends of the bows.

In operation of the wiper blade assembly rearward springable pressure is applied to the bows by the connecting bracket 18 and the wiper arm as will be understood and this pressure is resisted by engagement of the squeegee blade with the surface of the windshield placing flexing stress on the bows. Where the squeegee engages a straight or relatively regularly curved element of the windshield, the squeegee assumes a relatively straight or uniformly curved longitudinal shape as shown in FIG. 1 and the pressure of the bows 8 and 9 is uniformly distributed along the blade. As the wiper blade is swung angularly toward the side of a windshield, the driving and connecting bracket 18 will move rearwardly slightly as it progresses toward the rearwardly curved side portion of the windshield. This will cause the pivot pin 20 to move rearwardly or downwardly a short distance corresponding to the position indicated in dotted lines at 20A in FIG. 1 while the lower ends 10–12 of the bows remain in approximately the same plane and alignment.

The downward movement of the pivot 20 produces a relatively small deflection of the ear 11 of the lower bow 8 and a substantially greater deflection of the upper ear 13 of the upper bow 9. This results in a relatively sharp curvature of the upper or outer end of the squeegee blade as at 2B in FIG. 1, causing the end of the blade to conform and press firmly against the curved side edge of a compoundly curved windshield. An effective conforming and uniform pressure of the squeegee blade is thus provided with only two flexible bows and a single pivotal connection to the operating arm. Other types of connections between the ends of the bows and the blade and other connections between the bows and the operating arm can be utilized as desired and still obtain the flexing and conforming action of the mounting bows.

What is claimed as new is:

1. A windshield wiper blade assembly comprising an elongated squeegee blade having a thin wiping edge and a transversely thickened back defining a longitudinal slot in its back side with spaced side flanges laterally overlapping the sides of the slot, a transversely rigid reinforcing strip in said slot flexible in a plane normal to said back, a pair of transversely rigid bows flexible in a plane normal to said back and arranged in crossing relation in said plane, narrowed tongues on the ends of said bows passed through holes provided therefor in said reinforcing strip and reversely bent thereunder to couple the ends of said bows to said blade at each end of the blade and at intermediate points spaced from each other somewhat less than the space between the end connections, oppositely opening facing notches formed in the sides of said bows with the bows passing through the notches at the crossing point to overlap over said blade, outwardly turned ears on the edges of said notches arranged in lapped relation and pivoted together, and a driving bracket adapted for connection to a wiper drive arm having depending spaced ears connected to said ears on said bows at the pivot connection of the bows.

2. A windshield wiper blade assembly comprising an elongated squeegee blade having a thin wiping edge and a transversely thickened back defining a longitudinal slot in its back side with spaced side flanges laterally overlapping the side of the slot, a transversely rigid reinforcing strip in said slot flexible in a plane normal to said back, a pair of transversely rigid bows flexible in a plane normal to said back and arranged in crossing relation in said plane, narrowed tongues on the ends of said bows connecting the ends of said bows to said blade at each end of the blade and at intermediate points spaced from each other somewhat less than the space between the end connections, oppositely opening facing notches formed in the side of said bows with the bows passing through the notches at the crossing point to overlap over said blade, outwardly turned ears on the edges of said notches pivoted together, and a driving bracket adapted for connection to a wiper drive arm having depending spaced ears connected to said ears on said bows.

3. A windshield wiper blade assembly comprising an elongated squeegee blade having a thin wiping edge and a transversely thickened back defining a longitudinal slot in its back side with spaced side flanges laterally overlapping the side of the slot, a transversely rigid reinforcing strip in said slot flexible in a plane normal to said back, a pair of transversely rigid bows flexible in a plane normal to said back and arranged in crossing relation in said plane, means connecting the ends of said bows to said blade at each end of the blade and at intermediate points spaced from each other somewhat less than the space between the end connections and the intermediate points.

oppositely opening facing notches formed in the side of said bows with the bows passing through the notches at the crossing point to overlap over said blade, outwardly turned ears on the edges of said bows pivoted together, and a driving bracket adapted for connection to a wiper drive arm connected to said ears on said bows.

4. A windshield wiper blade assembly comprising an elongated squeegee blade having a thin wiping edge and a transversely thickened back, a reinforcing strip in said back flexible in a plane normal to said back, a pair of transversely rigid bows flexible in a plane normal to said back and arranged in crossing relation in said plane, means connecting the ends of said bows to said blade at each end of the blade and at intermediate points spaced from each other, oppositely opening facing notches formed in the side of said bows with the bows passing through the notches at the crossing point to overlap over said blade, outwardly turned ears on the edges of said bows pivoted together, and a driving bracket adapted for connection to a wiper drive arm connected to said ears on said bows.

5. A windshield wiper blade assembly comprising an elongated squeegee blade having a thin flexible wiping edge and a relatively more rigid back, a pair of transversely rigid bows arranged in crossing relation in the general plane of said blade, means connecting the ends of said bows to said blade at each end of the blade and at intermediate points spaced from each other somewhat less than the space between the end connections and the intermediate points, oppositely opening facing notches formed in the side of said bows with the bows passing through the notches at the crossing point to overlap over said blade, outwardly turned ears on the edges of said notches pivoted together, and a driving bracket adapted for connection to a wiper drive arm connected to said ears on said bows.

6. A windshield wiper blade assembly comprising an elongated squeegee blade having a thin flexible wiping edge and a relatively more rigid back, a pair of transversely rigid bows arranged in crossing relation in the general plane of said blade, means connecting the end of said bows to said blade at each end of the blade and at intermediate points spaced from each other, oppositely opening facing notches formed in the side of said bows with the bows passing through the notches at the crossing point to overlap over said blade, a pivotal connection between said bows at said crossing point, and a driving bracket adapted for connection to a wiper drive arm connected to said bows adjacent said crossing point.

7. A windshield wiper blade assembly comprising, an elongated squeegee blade having a reinforced back flexible in a longitudinal plane normal to the back and relatively inflexible transversely of the plane, a pair of bows arranged in crossing relation generally in said plane and flexible in said plane, driving connections formed between the ends of each of said bows and opposite ends of said back and spaced intermediate portions of said back, opposed inwardly facing notches formed in said bows at the crossing portions thereof permitting partial overlapping of the bows, attaching ears turned outwardly from the inner edges of the notches in said bows at the crossing point of the bows, a pivot disposed transversely of said plane connecting said ears, and an attaching bracket adapted to be connected to an operating arm connected to said ears by said pivot.

8. A windshield wiper blade assembly comprising, an elongated squeegee blade having a reinforced back flexible in a longitudinal plane normal to the back and relatively inflexible transversely of the plane, a pair of bows arranged in crossing relation generally in said plane and flexible in said plane, driving connections formed between the ends of each of said bows and opposite ends of said back and spaced intermediate portions of said back, opposed inwardly facing notches formed in said bows at the crossing portions thereof permitting partial overlapping of the bows, attaching ears turned outwardly from said bows at the crossing point of the bows, a pivot disposed transversely of said plane connecting said ears, and an attaching bracket adapted to be connected to an operating arm connected to said ears.

9. A windshield wiper assembly comprising an elongated squeegee blade member of flexibly resilient nonmetallic material having a longitudinally extending rearwardly opening recess therein, a springable body member support of transversely flat cross section retainingly disposed in said recess in said blade member and having longitudinally spaced pairs of longitudinal slots therein, a pair of springably resilient bow members disposed in interlapping relation to each other and with their ends slidably and retainingly engaged in said slots in said body member support, said bow members having integral outwardly projecting ears disposed side by side, and an actuating arm coupling member provided with laterally spaced ears embracing said ears on said bow members and pivotally connected thereto by a pivot disposed transversely of said bow members.

10. A windshield wiper assembly comprising an elongated squeegee blade member of flexible resilient nonmetallic material having alongitudinally extending recess therein of substantially uniform cross section and having a longitudinal centrally disposed slot-like opening in its rear side, a springably resilient transversely rigid body member support and coupling member of flat cross section disposed in said recess in said blade member and having longitudinally spaced pairs of longitudinal slots therein, a pair of springably resilient bow members disposed in interlapping relation to each other with their ends slidably and retainingly engaged in said slots in said body member support and coupling member, said bow members having integral outwardly projecting ears disposed in side by side relation, and an actuating arm coupling member provided with laterally spaced ears disposed in lateral thrust supporting engagement with said ears on said bow members and pivotally connected thereto by a pivot disposed transversely of said bow members.

11. A windshield wiper assembly comprising an elongated squeegee blade member of flexibly resilient nonmetallic material comprising a body portion having a longitudinally extending recess therein with a relatively restricted opening at its rear side disposed centrally thereof, a springably resilient transversely rigid body support and coupling member disposed in said recess in said blade member, a pair of springably resilient bow members disposed in interlapping relation to each other with their ends slidably and supportedly engaged with said body support and coupling member, said bow members having integral outwardly projecting ears disposed in side by side relation, and an actuating arm coupling member provided with laterally spaced ears and disposed in lateral thrust supporting engagement with said ears on said bow members and pivotally connected thereto by a pivot disposed transversely of said bow members.

References Cited by the Examiner
UNITED STATES PATENTS 2,741,792 4/56 Ehrlich et al. _____ 15—250.42
2,920,335 1/60 Ryck _____ 15—250.42

CHARLES A. WILLMUTH, *Primary Examiner.*